United States Patent [19]

Shaffer et al.

[11] Patent Number: 5,322,677
[45] Date of Patent: Jun. 21, 1994

[54] PROCESS FOR PRODUCING CONCENTRATED HYPOCHLOROUS ACID SOLUTIONS

[75] Inventors: John H. Shaffer; James K. Melton, both of Cleveland; Joseph Borcz, Chattanooga, all of Tenn.

[73] Assignee: Olin Corporation, Stamford, Conn.

[21] Appl. No.: 5,855

[22] Filed: Jan. 15, 1993

Related U.S. Application Data

[63] Continuation of Ser. No. 754,862, Sep. 4, 1991, abandoned.

[51] Int. Cl.$^5$ .................... C01B 11/04; C01B 11/00
[52] U.S. Cl. ................................. 423/473; 423/472
[58] Field of Search ........................... 423/473, 472

[56] References Cited

U.S. PATENT DOCUMENTS 5,037,627 10/1991 Melton et al. .................. 423/473

Primary Examiner—Benjamin R. Fuller
Assistant Examiner—Valerie Ann Lund
Attorney, Agent, or Firm—William A. Simons

[57] ABSTRACT

A process for producing an aqueous hypochlorous acid solution reacts droplets of an alkali metal hydroxide solution containing greater than 50 percent by weight of the alkali metal hydroxide with chlorine gas. The reaction produces a gaseous mixture of dichlorine monoxide, chlorine, hypochlorous acid vapor and water vapor, and solid particles of alkali metal chloride. The solid particles of alkali metal chloride are separated and the gaseous mixture condensed at a temperature in the range of from about −33° C. and about −5° C. to produce the aqueous hypochlorous acid solution. The process of the invention results in increased yields of hypochlorous acid and provides an economic basis for increased production capacity. The aqueous hypochlorous acid solutions produced are highly pure and as a result have significantly improved stability.

11 Claims, 3 Drawing Sheets

PROCESS FOR PRODUCING CONCENTRATED HYPOCHLOROUS ACID SOLUTIONS

This application is a continuation of application Ser. No. 07/754,862, filed Sep. 4, 1991 abandoned.

BACKGROUND OF THE INVENTION

Field of the Invention

This invention relates to an improved process for producing concentrated solutions of hypochlorous acid.

"Hypochlorous acid" has long been known as a bleaching agent and as a reagent in the Preparation of organic compounds such as chlorohydrins and chloramines. It has only been available commercially, however, in relatively dilute solutions i.e. 20% or less by weight of HOCl.

More recently, a process has been described in U.S. Pat. No. 4,146,578, issued Mar. 27, 1979 to J. P. Brennan et al in which hypochlorous acid is produced by spraying an aqueous alkali metal hydroxide in droplet form into gaseous chlorine. The reaction produces a gaseous mixture of chlorine, hypochlorous acid vapor and dichlorine monoxide, and solid particles of an alkali metal chloride. The gaseous mixture is scrubbed in water to produce a concentrated aqueous solution of hypochlorous acid. However, because of the dilution of the gaseous product with water, the hypochlorous acid solutions produced were less concentrated than desired, for example, for the production of its inorganic salts.

A further development in this process has been described in W. O. 90/05111, published May 17, 1990 by J. K. Melton et al. In this process, the gaseous mixture of hypochlorous acid, chlorine and dichlorine monoxide and water is condensed to produce a concentrated hypochlorous acid solution containing 35 to 60 percent by weight of HOCl. Following the condensation, a non-condensed gaseous mixture of chlorine and dichlorine monoxide is recovered from the condenser and after heating, the gaseous mixture is returned to the hypochlorous acid reactor. Melton et al employ molar ratios of chlorine to alkali metal hydroxide of at least 20:1. Use of these high concentrations of chlorine are effective in increasing the efficiency of the process and further in diluting the non-condensed gaseous mixture containing dichlorine monoxide recovered from the condenser. The non-condensed gaseous mixture was heated to high temperatures as it served as a primary source of heat for the reaction. However, the use of high concentrations of chlorine gas increases the material and operating costs of the process.

Further, commercial production of hypochlorous acids having concentrations above 50% by weight of HOCl by the processes of the prior art has not been accomplished. The production of hypochlorous acids having concentrations above 50% by weight of HOCl requires gaseous mixtures containing very high concentrations of dichlorine monoxide. The limited teachings of the prior art state that to prevent explosions, gaseous mixtures containing dichlorine monoxide should be maintained at concentrations of $Cl_2O$ below 25% by volume and at temperatures below 120° C. These conditions, however, seriously limit production capacity. By requiring large volumes of diluent gases and low reaction temperatures, increases in plant capacity require large increases in equipment size and add significant increases in capital, energy and operating costs.

Thus there is a need for a process for producing hypochlorous acid solutions having a concentration of greater than 50% by weight of HOCl which provides high concentrations of dichlorine monoxide while reducing volumes of diluent gases.

BRIEF SUMMARY OF THE INVENTION

It is an object of the invention to provide a process for producing solutions of hypochlorous acid having high concentrations of HOCl while substantially reducing the volume of diluent gases.

An additional object of the present invention is to provide a process for producing highly concentrated aqueous solutions of hypochlorous acid which provides increased production capacity without significant increases in equipment size.

Another object of the present invention is to provide a process for producing highly concentrated aqueous solutions of hypochlorous acid having improved yields.

A further object of the present invention is to provide a process for producing highly concentrated aqueous solutions of hypochlorous acid having reduced energy requirements.

A still further object of the present invention is to provide a process for producing highly concentrated aqueous solutions of hypochlorous acid having reduced material and operating costs.

Yet another object of the present invention is to provide a process for producing solutions of hypochlorous acid having concentrations of HOCl of greater than 50% by weight under safe conditions.

These and other advantages are provided in a process for producing an aqueous hypochlorous acid solution by reacting droplets of an alkali metal hydroxide solution containing greater than 50 percent by weight of the alkali metal hydroxide with chlorine gas to produce a reaction mixture comprising a gaseous mixture of dichlorine monoxide, chlorine, hypochlorous acid vapor and water vapor, and solid particles of alkali metal chloride, separating the solid particles of alkali metal chloride, and condensing the gaseous mixture at a temperature in the range of from about −33° C. to about −5° C.

DETAILED DESCRIPTION OF INVENTION

Figure 1:
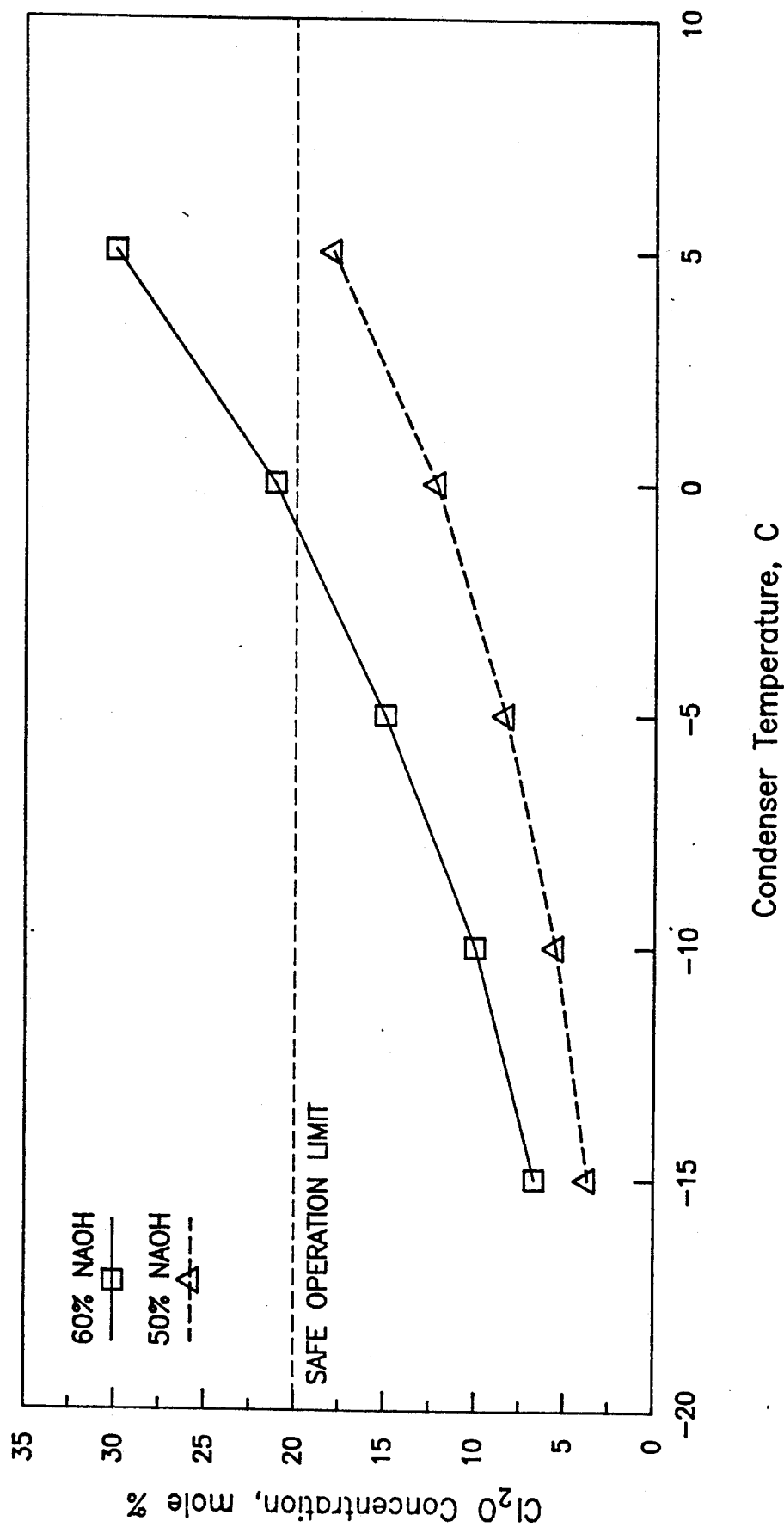
FIG. 1 is a graphic representation, computer-generated from thermodynamic models relating the condenser temperature and the $Cl_2O$ concentration (mole %) in the non-condensed gaseous mixture recovered from the condenser when operated at atmospheric pressure using 50% NaOH and 60% NaOH.

More in detail, the process is carried out in a suitable reactor such as one provided with means for spraying discrete droplets of an aqueous solution of an alkali metal hydroxide into the reactor; means for feeding gaseous chlorine into the reactor; means for withdrawing solid alkali metal chloride product from the reactor; and means for withdrawing a gaseous mixture comprised of dichlorine monoxide, unreacted chlorine, hypochlorous acid vapor, and water vapor from the reactor.

Discrete drops of an alkali metal hydroxide solution are used in the reaction and are produced, for example, by at least one atomizer preferably positioned at or near the top of the reactor.

Any alkali metal hydroxide capable of reacting with gaseous chlorine to form hypochlorous acid may be employed as a reactant in the process of this invention. Typical examples of suitable alkali metal hydroxides include sodium hydroxide, potassium hydroxide, lithium hydroxide and mixtures thereof. Sodium hydroxide is the preferred reactant since the resulting sodium chloride by-product is more easily disposed of than the other alkali metal chlorides. For the sake of simplicity, the process of the invention will be described using sodium hydroxide as the alkali metal hydroxide.

As high concentrations of hypochlorous acid are desired, aqueous solutions of sodium hydroxide having a concentration of greater than about 50 percent by weight of NaOH are employed. preferably the sodium hydroxide concentration is from about 52 to about 70, and more preferably from about 53 to about 65 percent by weight of NaOH.

Droplet sizes are selected for the highly concentrated aqueous solutions of sodium hydroxide which permit a substantially complete reaction of the droplets when sprayed into the chlorine gas atmosphere. For example, caustic droplets of a size between about 50 to 200 microns are of sufficient size to react substantially instantaneously to produce a reaction product having high concentrations of dichlorine monoxide.

The novel process of the present invention employs an excess of chlorine gas above the stoichiometric amount of sodium hydroxide as illustrated by the following equation:

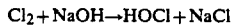

Excesses of chlorine gas result in increased yields of hypochlorous acid. In addition, the use of an excess of chlorine gas aids in maintaining the reaction temperature within the desired range.

The reaction requires sufficient heat to maintain dichlorine monoxide, hypochlorous acid and water in the vapor phase and produce substantially dry solid sodium chloride particles. The reaction temperature is controlled to prevent significant thermal decomposition of the dichlorine monoxide present. For example, the reaction temperature is maintained in the range of from about 80° to about 120° C. At these temperatures it is possible to achieve high yields of hypochlorous acid as a product, as they substantially prevent the presence of water in the liquid phase in the reaction mixture. Liquid water in the solid salt formed in the presence of the gases in the reaction mixture results in the formation of chlorate as an impurity in the salt. Significant losses of dichlorine monoxide and hypochlorous acid vapor from the reaction mixture result with a significant reduction in yields as evidenced by the reduction in HOCl concentration in the hypochlorous acid solutions produced. The solid sodium chloride produced in the process of the invention has low concentrations of moisture i.e. less than about 5%, preferably less than about 3%, and more preferably less than about 1% by weight. As a result the formation of chlorate is minimized and its concentration in the sodium chloride particles is less than about 10 percent by weight, and preferably less than about 6 percent by weight.

In a continuous process, the gaseous mixture of hypochlorous acid vapor, water vapor, chlorine gas, and chlorine monoxide gas produced in the reactor is removed from the reactor and passed through a solids separator to remove any fine particles of sodium chloride which may be present. The solids-free gaseous mixture recovered, having high concentrations of $Cl_2O$, can be used as a source of dichlorine monoxide gas, for example in gas bleaching applications. Preferably the gaseous mixture is liquefied to produce an aqueous solution of hypochlorous acid.

The liquefaction is carried out by condensing the gaseous mixture. Suitable condensation temperatures are those which condense the gaseous mixture to produce hypochlorous acid solutions having a concentration of at least about 45 percent by weight of HOCl without forming a significant concentration of solids. Condensation temperatures below about −5° C. are selected, for example, those in the range of from about −33° to about −5° C., preferably from about -30° to about −7° C., more preferably from about −25° to about −8° C., and most preferably from about −15° to about −10°C. Substantially all of the water vapor in the gaseous mixture condenses and dichlorine monoxide gas and hypochlorous acid vapor dissolve in the condensed water to produce an aqueous solution of hypochlorous acid having at least about 45 percent by weight of HOCl, for example, from about 45 to about 70, and preferably from about 52 to about 65 percent by weight of HOCl.

The condensation may be operated at atmospheric or superatmospheric pressures. As there is a dirth of data on the properties of the highly reactive, highly acidic hypochlorous acid solutions having concentrations above 50% by weight of HOCl, it may be desirable to add water to the condenser to maintain the concentration of the solutions produced below about 60% by weight of HOCl.

Following the condensation at these very low temperatures, surprisingly the concentration of dichlorine monoxide in the non-condensed gaseous mixture of chlorine and dichlorine monoxide is reduced to safe levels when heated and recycled to the reactor for producing the gaseous mixture. As shown in FIG. 1 the concentration of dichlorine monoxide in the noncondensed gaseous mixture is well below the 20% by volume level. This provides increased safety in operating the process of the invention.

The non-condensed gaseous mixture of chlorine and dichlorine monoxide and which is substantially free of water vapor is recovered for recycle to the reactor for producing hypochlorous acid.

Recycle gases, recovered from the condenser, are passed through a heat exchanger and fed back into the reactor as a gaseous heated medium. The recycle gases, at a temperature in the range of from about 100° to about 130°, are used as reactant gases in the production of the hypochlorous acid and, with the heat of reaction, serve as the primary sources of heat. The low concentrations of dichlorine monoxide present in the recycle gases significantly reduce safety hazards when heated.

Figure 2:
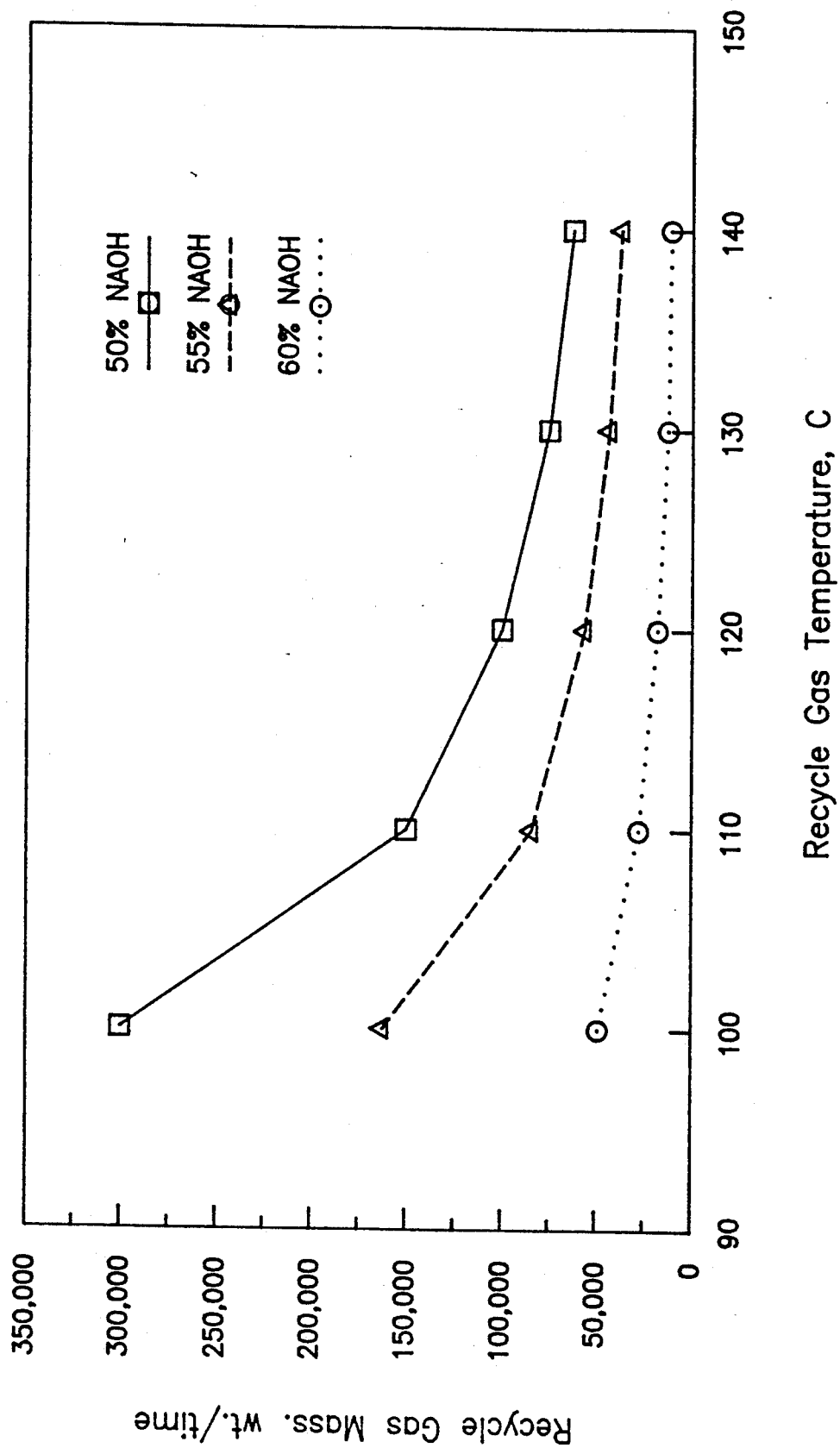
FIG. 2 is a graphic representation, computer-generated from thermodynamic models illustrating the recycle mass to recycle temperature of the non-condensed gaseous mixture produced to maintain the reactor temperature at 90° C. using sodium hydroxide concentrations of 50, 55 and 60% by weight of NaOH in the reactor.

In the novel process of the invention employing sodium hydroxide concentrations of greater than about 50% by weight of NaOH, the volume and mass of recycle gases is also substantially reduced. FIG. 2 graphically illustrates the mass reductions in terms of the recycle temperature and caustic concentration. The recycle mass is that required, at a given temperature of the recycle gases, to maintain the desired reactor temperature. For example, using 60% by weight of NaOH in the reactor, the required recycle mass of recycle gases at a temperature of 100° C. is 50,000 wt units/time unit. In comparison, when reacting 50% by weight of NaOH in the reactor, the required recycle mass at a temperature of 100° C. is 300,000 wt units/time unit. As the recycle gases contain unreacted dichlorine monoxide, it is desirable to maintain the temperature of the recycle gases as low as possible to limit thermal decomposition of $Cl_2O$. This can be readily accomplished in the process of the invention as the dichlorine monoxide concentrations in the recycle gas are well below the concentrations considered to be a safety hazard.

Figure 3:
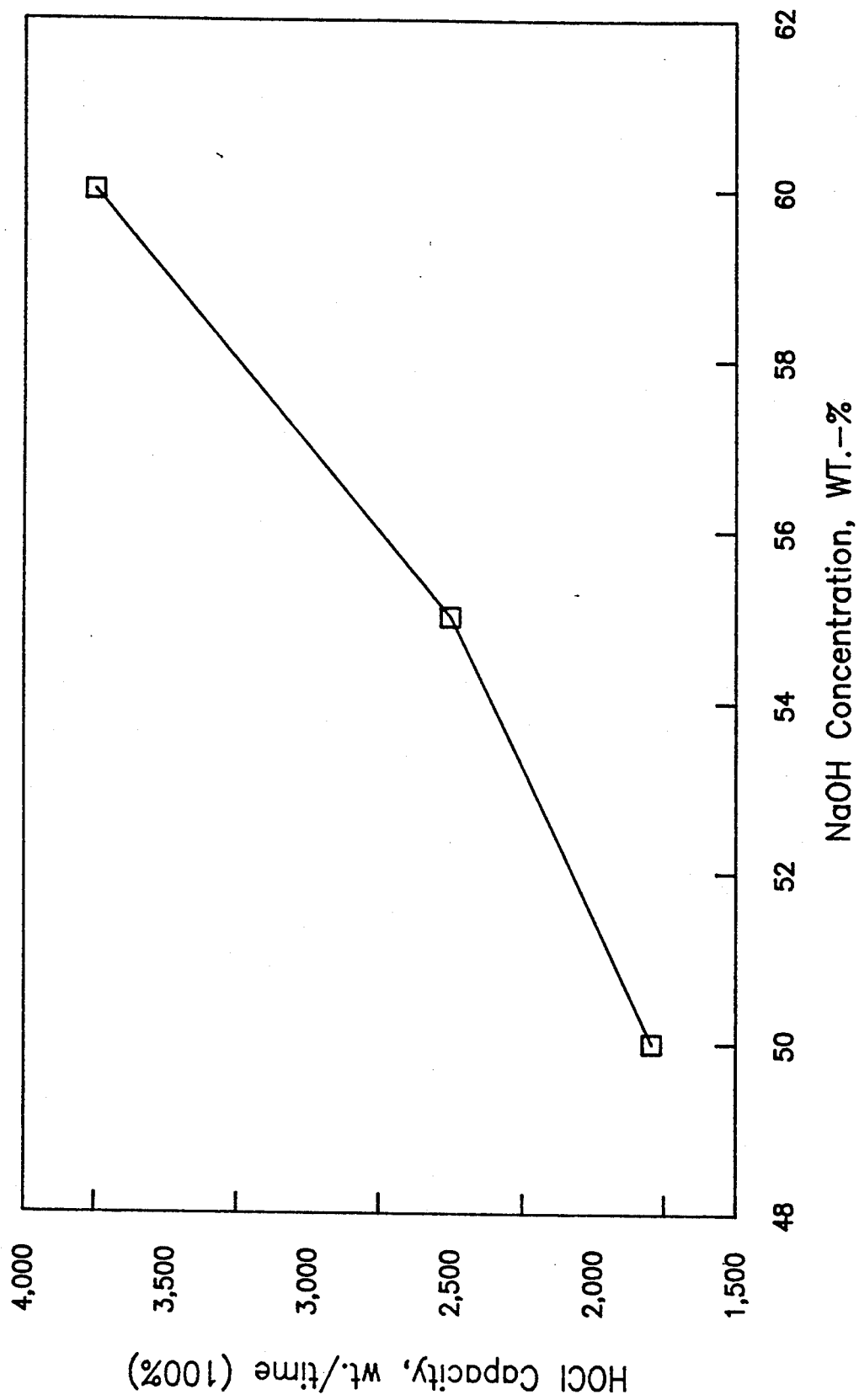
FIG. 3 is a graphic representation, computer-generated from thermodynamic models showing the relationship of the production capacity of a HOCl solution on a 100% basis when using weight concentrations of NaOH in the range of 50 to 60%.

The process of the invention results in increased yields of hypochlorous acid and provides an economic basis for increased capacity as illustrated in FIG. 3. The aqueous hypochlorous acid solutions produced are highly pure and as a result have significantly improved stability. The concentrated hypochlorous acid solution is free of ionic impurities such as alkali metal, chloride, and chlorate ions. For example, concentrations of the chloride ion are less than about 50 parts per million; the alkali metal ion concentration is less than about 50 parts per million; and the chlorate ion concentration is no higher than about 100 parts per million. The dissolved chlorine concentration in the hypochlorous acid solution of the present invention is remarkably low, being less than about 3 percent, and preferably less than about 2 percent by weight.

The concentrated aqueous hypochlorous acid solution produced by the novel process of the present invention can be used as a bleaching or sanitizing agent.

What is claimed is:

1. A process for producing an aqueous hypochlorous acid solution having a concentration of HOCl of 50% to 60% by weight comprising the steps of:
   (1) reacting droplets of an aqueous alkali metal hydroxide solution containing greater than 50% by weight of the alkali metal hydroxide with a molar excess of chlorine gas at a reaction temperature from about 80° C. to about 120° C. to produce a reaction mixture comprising a gaseous mixture of dichlorine monoxide, chlorine, hypochlorous acid vapor, and water vapor and solid particles of alkali metal chloride having a concentration of water of less than about 5% and a concentration of alkali metal chlorate of less than 10% by weight;
   (2) separating said gaseous mixture from said solid particles;
   (3) subjecting said separated gaseous mixture to a temperature from about −33° C. to about −5° C. to condense substantially all of the water vapor in said gaseous mixture and to dissolve the hypochlorous acid vapor and a portion of the dichlorine monoxide in said condensed water vapor and simultaneously adding sufficient water to form a condensed liquid solution comprising a highly pure aqueous hypochlorous acid solution having a concentration of HOCl from about 50% to about 60% by weight and having a concentration of chloride ion of less than 50 parts per millions; alkali metal ion concentration of less than about 50 parts per million, chlorate ion concentration of no higher than about 100 parts per million and dissolved chlorine concentration being less than 3% by weight and to form a noncondensed gaseous mixture comprising chlorine and dichlorine monoxide, wherein concentration of dichlorine monoxide is less than about 20% by moles in said gaseous noncondenssed mixture; and
   (4) separating said condensed liquid solution from said noncondensed gaseous mixture.

2. The process of claim 1 wherein the alkali metal hydroxide is sodium hydroxide.

3. The process of claim 2 wherein sodium hydroxide concentration is from about 52% to about 70% by weight NaOH.

4. The process of claim 3 wherein said sodium hydroxide concentration is from about 53% to about 65% by weight of NaOH.

5. The process of claim 2 wherein droplet size of sodium hydroxide is from about 50 to about 200 microns.

6. The process of claim 2 wherein said solid alkali metal chloride is solid sodium chloride and the concentration of water in solid sodium chloride is less than about 3%.

7. The process of claim 6 wherein said alkali metal chlorate is sodium chlorate and concentration of sodium chlorate is less than about 6% by weight.

8. The process of claim 1 where said noncondensed gaseous mixture comprising chlorine and dichlorine monoxide is heated to a temperature of about 100° C. to about 130° C. and then recycled back to the reactor as a heat source for reaction step (1).

9. The process of claim 1 wherein the condensing in said step (3) is carried at super atmospheric pressures.

10. The process of claim 1 wherein the condensing in step (3) is carried out at about −30° C. to about −7° C.

11. A process for producing an aqueous hypochlorous acid solution having a concentration of HOCl of 50% to 60% by weight comprising the steps of:
   (1) reacting droplets of an aqueous sodium hydroxide solution containing about 52% to 70% by weight of sodium hydroxide, said droplets being in size from about 50 to about 200 microns, with a molar excess of chlorine gas at a reaction temperature from about 80° C. to about 120° C. and at super atmospheric pressures to produce a reaction mixture comprising a gaseous mixture of dichlorine monoxide, chlorine, hypochlorous acid vapor, and water vapor and solid particles of sodium chloride having a concentration of water of less than about 3% and a concentration of alkali metal chlorate of less than 6% by weight;
   (2) separating said gaseous mixture from said solid particles;
   (3) subjecting said separating gaseous mixture to a temperature from about −33° C. to about −5° C. to condense substantially all of the water vapor in said gaseous mixture and to dissolve the hypochlorous acid vapor and a portion of the dichlorine monoxide in said condensed water vapor and simultaneously adding sufficient water to the resulting condensed liquid to form a condensed liquid solution comprising a highly pure aqueous hypochlorous acid solution having a concentration of HOCl from about 50% to about 60% by weight and having a concentration of chloride ion of less than 50 parts per millions; alkali metal ion concentration of less than about 50 parts per million, chlorate ion concentration of no higher than about 100 parts per million and dissolved chlorine concentration of less than about 3% by weight and to form a noncondensed gaseous mixture comprising chlorine and dichlorine monoxide, wherein concentration of dichlorine monoxide is less than about 20% by moles in said gaseous noncondensed mixture;

(4) separating said condensed liquid solution from said noncondensed gaseous mixture;

(5) heating said noncondensed gaseous mixture to a temperature of about 100° C. to about 130° C.; and (6) recycling the heated noncondensed gaseous mixture to the reactor as a heat source for reaction step (1).

* * * * *